United States Patent
Kadomsky et al.

[15] 3,668,507
[45] June 6, 1972

[54] APPARATUS FOR DAMPING OSCILLATIONS IN THREE-PHASE BRIDGE CONVERTERS

[72] Inventors: Dmitry Evgenievich Kadomsky, prospekt Smirnova, 16, korpus 2, kv. 35; Alexandr Sergeevich Nazarov, Ofitsersky pereulok, 7, kv. 7, both of Leningrad, U.S.S.R.

[22] Filed: June 4, 1971
[21] Appl. No.: 150,119

[52] U.S. Cl..................................321/11, 321/27, 321/59
[51] Int. Cl. .........................................................H02m 1/18
[58] Field of Search .................................321/5, 11–14, 27, 321/59

[56] References Cited

UNITED STATES PATENTS 3,351,779  11/1967  Hehenkamp..............................321/11

FOREIGN PATENTS OR APPLICATIONS 807,929    1/1959   Great Britain............................321/27
1,000,051  8/1965   Great Britain............................321/11

Primary Examiner—William M. Shoop, Jr.
Attorney—Waters, Roditi, Schwartz & Nissen

[57] ABSTRACT

An apparatus for damping oscillations in three-phase bridge converters, made in the form of two three-branch stars, whose branches are damping sections composed of a capacitor and a resistor in series and are connected each to the respective phase of the bridge circuit, while the neutral points of the stars are connected each to one of the poles of the bridge circuit, and there is a series resistor placed between at least one neutral point and the respective pole.

2 Claims, 1 Drawing Figure

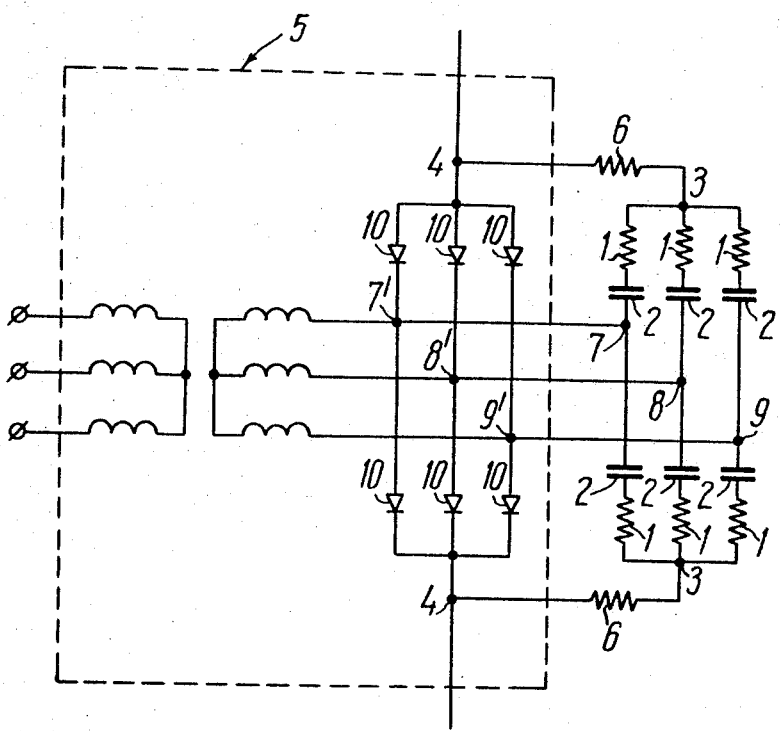

APPARATUS FOR DAMPING OSCILLATIONS IN THREE-PHASE BRIDGE CONVERTERS

The present invention relates to static converters and, more specifically, to apparatus for damping oscillations in three-phase bridge converters.

In the prior art, there is an apparatus for damping oscillations in three-phase bridge converters, made in the form of two three-branch stars the neutral points of which are connected each to one of the poles of a bridge converter, while the branches which are damping sections composed of a capacitor and resistor in series are connected each to the respective phase of the bridge circuit (see USSR Inventor's Certificate No. 111060, Class 21d², 12/02, 1957).

However, this prior art apparatus does not damp oscillations in three-phase bridge converters completely.

This prior art apparatus effectively dampens only those oscillations which occur between the poles of the bridge circuit when all rectifying elements of the bridge are extinguished.

The oscillations taking place between the phases of the bridge circuit when all rectifying elements are extinguished cannot be dampened out by this prior art apparatus.

To effectively dampen out the oscillations occuring between the phases of the bridge circuit, it is necessary to use additional damping devices.

It is an object of the present invention to provide an apparatus for damping oscillations in three-phase bridge converters, free from the above-mentioned disadvantage.

The invention aims at providing an apparatus for damping oscillations in three-phase bridge converters which effectively and simultaneously dampens out oscillations occuring both between the phases and between the poles of the bridge circuit when all rectifying elements of the bridge converter are extinguished.

With this aim in view, the present invention resides in that in an apparatus for damping oscillations in three-phase bridge converters, made in the form of two three-branch stars, according to the invention, there is a series resistor between at least the neutral point of one star and the respective pole of the bridge circuit.

The invention will be more fully understood from the following description of a preferred embodiment when read in connection with the accompanying drawing which shows a circuit schematic diagram of an apparatus for damping oscillations, connected to a three-phase bridge converter, according to the invention.

Referring to the drawing, there is an apparatus made in the form of two three-branch stars composed of resistors 1 and capacitors 2 in series. Neutral points 3 of the stars are connected each to the respective pole 4 of a three-phase bridge converter 5 via series resistors 6. The free ends 7, 8, and 9 of the stars are connected to the respective phases 7', 8', and 9' of the bridge circuit 5.

In operation of the converter 5, the apparatus disclosed herein performs two functions.

1. It dampens out oscillations occuring between the phases 7' and 8', 8' and 9', 9' and 7' of the bridge circuit 5 when its rectifying elements 10 are extinguished. In this case, the quality of damping is determined by the values of the capacitors 2 and resistors 1.

2. It dampens out oscillations between the poles 4 when all rectifying elements 10 are extinguished. In this case, the quality of damping is determined by the values of the capacitors 2, resistors 1, and series resistors 6.

These values may be selected so as to ensure an optimum damping of oscillations in both cases. It should be noted that the series resistors 6 may be either equal or different in value.

The present invention makes redundant the use of two types of oscillation-damping apparatus, each of which performs only one of the two functions defined above.

The series resistors 6 limit the discharge of the capacitors 2, and this considerably alleviates the load on the rectifying elements 10 as they fire.

The apparatus disclosed herein can effectively be used to dampen oscillations in converters comprising one or several bridges connected differently (notably, in series), for example, in the converter substations of d.c. power transmission lines.

WHAT IS CLAIMED IS:

1. An apparatus for damping oscillations in three-phase bridge converters, comprising: two three-branch stars; branches of said stars, which are damping sections composed of a capacitor and a resistor in series; said branches connected each to the respective phase of said bridge circuit; neutral points of said stars, connected each to one of the poles of said bridge circuit; a series resistor placed between the neutral point of at least one star and the respective pole of the bridge circuit.

2. An apparatus for damping oscillations in three-phase bridge converters, comprising: two three-branch stars; branches of said stars which are damping sections composed of a capacitor and a resistor in series; said branches connected each to the respective phase of said bridge circuit; neutral points of said stars connected each to one of the poles of said bridge circuit; a series resistor placed between the neutral point of one star and the respective pole of the bridge circuit; a second series resistor placed between the neutral point of the other star and its respective pole of the bridge circuit.

* * * * *